Patented Feb. 12, 1935                                                         1,990,812

UNITED STATES PATENT OFFICE 1,990,812

ACID RESISTING VITREOUS ENAMEL

Perry G. Bartlett and Harry C. Kremers, Philadelphia, Pa., assignors to Röhm & Haas Company, Philadelphia, Pa.

No Drawing. Application February 5, 1932, Serial No. 591,241

8 Claims. (Cl. 106—36.2)

This application relates to vitreous enamels. It has for its object the preparation of a dry process enamel which is acid resistant and capable of use in conjunction with zirconium compounds as opacifier. A further object is the use of glass cullet in the preparation of acid resisting vitreous enamels. Other objects will be developed below.

Ordinary dry process enamels for cast iron are readily attacked by common fruit and vegetable juices and also by the harsher cleansing materials. These substances remove the gloss from the enamel surface and leave a rough spot which soon becomes permanently stained and discolored. Dry process enamels have been developed possessing various degrees of resistance to those acids present in the fruit and vegetable juices, which ordinarily stain the ware. The variation in degree of resistance possessed by different enamels makes it necessary to have some standard test by which comparisons can be made. We have adopted for this purpose the test which is most commonly used in the trade, and is the nearest of any to becoming the standard test for acid resistance. Only those enamels which are not visibly stained after a drop of fresh 10% citric acid solution has remained on them for 15 minutes, are considered to be acid resistant. Hereafter, in this application the term acid-resistance is used only in that sense. Enamels which are resistant according to this test also resist quite successfully the action of the strong inorganic, or mineral acids such as sulphuric, hydrochloric and nitric acids. Alkali resistance may similarly be defined as complete resistance to strong caustic (NaOH) solution when evaporated to dryness on the enamel surface. Alkali resistance is used in this application with that significance.

Acid resisting dry process enamels, opacified with tin oxide or with compounds of antimony have previously been developed. Typical formulas for tin and antimony acid resisting enamels are given below:

Tin oxide, acid resistant enamel

| (1) Percentage composition of melted batch | (2) Raw batch mixture | (3) Seger or molecular formula | |
|---|---|---|---|
| $Na_2O$ — 16.7% | Sodium nitrate — 42 | $Na_2O$ — .701 | $SiO_2$ — 1.752 |
| $K_2O$ — 2.3 | Fluorspar — 22 | $K_2O$ — .064 | $TiO_2$ — .227 |
| $CaO$ — 1.8 | Red lead — 122 | $CaO$ — .083 $Al_2O_3$ .089 | $B_2O_3$ — .148 |
| $PbO$ — 13.0 | Feldspar — 177 | $PbO$ — .152 | $F_2$ — .082 |
| $Al_2O_3$ — 3.5 | Sodium silicate — 282 | | $SnO_2$ — .172 |
| $SiO_2$ — 40.5 | Sodium titanium silicate — 163 | 1.000 | 2.381 |
| $TiO_2$ — 7.0 | Tin oxide — 92 | | |
| $B_2O_3$ — 4.0 | Borax — 100 | | |
| $F_2$ — 1.2 | | | |
| $SnO_2$ — 10.0 | | | |
| 100.0% | 1000 | | |

Sodium antimonate, acid resistant enamel

| (1) Percentage composition of melted batch | (2) Raw batch mixture | (3) Seger or molecular formula | |
|---|---|---|---|
| $Na_2O$ — 17.0% | Soda ash — 13 | $Na_2O$ — .686 | $SiO_2$ — 1.712 |
| $K_2O$ — 5.0 | Potassium nitrate — 61 | $K_2O$ — .133 | $TiO_2$ — .219 |
| $ZnO$ — 2.0 | Zinc oxide — 18 | $ZnO$ — .063 $Al_2O_3$ .074 | $Sb_2O_5$ — .078 |
| $CaO$ — 1.0 | Whiting — 16 | $CaO$ — .045 | $B_2O_3$ — .236 |
| $PbO$ — 6.5 | Red lead — 58 | $PbO$ — .073 | $F_2$ — .060 |
| $B_2O_3$ — 6.6 | Borax — 157 | | |
| $F_2$ — .9 | Cryolite — 15 | 1.000 | 2.305 |
| $Al_2O_3$ — 3.0 | Feldspar — 124 | | |
| $SiO_2$ — 41.0 | Sod. silicate — 372 | | |
| $TiO_2$ — 7.0 | Titanium oxide — 61 | | |
| $Sb_2O_5$ — 10.0 | Sodium antimonate — 105 | | |
| 100.0% | 1000 | | |

Zirconium compounds as opacifiers have distinct advantages over other opacifying materials. They are cheaper to obtain than tin oxide and give a better color. As compared with compounds of antimony zirconium compounds are to be preferred because of their non-poisonous character, their inertness and irreducibility. Their inert character renders them less susceptible to variation in manufacturing processes.

No acid resistant enamels opacified with zirconium compounds have been previously developed. Now we have discovered an enamel which combines the advantages of acid-resistance and alkali-resistance together with the advantages of using zirconium compounds to give opacity. In order to develop such an enamel it was necessary to create a distinctly new and different type of enamel formula. This new type of formula is characterized by its high zinc oxide, silica and titanium dioxide content, and by the complete absence of boric oxide and fluorine compounds. Several typical examples of this type of formula are as follows:

Example 1

| (1) Percentage composition of melted batch | (2) Raw batch mixture | (3) Seger or molecular formula | |
|---|---|---|---|
| $Na_2O$ — 13.5 | Soda ash — 94 | $Na_2O$ — .461 | $SiO_2$ — 1.329 |
| $K_2O$ — 4.5 | Potassium nitrate — 53 | $K_2O$ — .101 | $TiO_2$ — .264 |
| $MgO$ — 0.9 | Zinc oxide — 92 | $MgO$ — .047 $Al_2O_3$ .064 | $ZrO_2$ — .187 |
| $ZnO$ — 10.0 | Red lead — 74 | $ZnO$ — .260 | |
| $CaO$ — 1.5 | Feldspar — 106 | $CaO$ — .057 | |
| $PbO$ — 7.8 | Glass cullet — 389 | $PbO$ — .074 | |
| $Al_2O_3$ — 3.3 | Titanium dioxide — 92 | | 1.780 |
| $SiO_2$ — 37.7 | Zirconium oxide — 100 | 1.000 | |
| $TiO_2$ — 10.0 | | | |
| $ZrO_2$ — 10.8 | | | |
| 100.0% | 1000 | | |

Example 2

| (1) Percentage composition of melted batch | (2) Raw batch mixture | (3) Seger or molecular formula |
|---|---|---|
| $Na_2O$ --- 13.0 | Potassium nitrate --- 42 | $Na_2O$ --- .446 |
| $K_2O$ --- 4.0 | Zinc oxide --- 106 | $K_2O$ --- .091 |
| $MgO$ --- 1.0 | Magnesia --- 10 | $MgO$ --- .053 |
| $ZnO$ --- 11.0 | Whiting --- 17 | $ZnO$ --- .288 |
| $CaO$ --- 1.0 | Litharge --- 85 | $CaO$ --- .038 |
| $PbO$ --- 8.8 | Feldspar --- 159 | $PbO$ --- .084 |
| $Al_2O_3$ --- 3.0 | Sodium silicate --- 284 | $Al_2O_3$ .063 { $SiO_2$ - 1.345; $TiO_2$ - .239; $ZrO_2$ - .195 } |
| $SiO_2$ --- 38.0 | Titanium dioxide --- 87 | 1.779 |
| $TiO_2$ --- 9.0 | Sodium zirconium silicate --- 192 | |
| $ZrO_2$ --- 11.2 | Zirconium silicate --- 18 | |
| 100.0% | 1000 | |

Example 3

| (1) | (2) | (3) |
|---|---|---|
| $Na_2O$ --- 14.4 | Soda ash --- 72 | $Na_2O$ --- .521 |
| $K_2O$ --- 2.6 | Sod. nitrate --- 38 | $K_2O$ --- .063 |
| $ZnO$ --- 11.5 | Zinc oxide --- 108 | $ZnO$ --- .319 |
| $PbO$ --- 9.5 | Feldspar --- 206 | $PbO$ --- .097 |
| $Al_2O_3$ --- 4.0 | Sod. silicate --- 287 | $Al_2O_3$ .087 { $SiO_2$ - 1.500; $TiO_2$ - .168; $ZrO_2$ - .220 } |
| $SiO_2$ --- 40.0 | Titanium dioxide --- 56 | 1.000 |
| $TiO_2$ --- 6.0 | Red lead --- 92 | 1.888 |
| $ZrO_2$ --- 12.0 | Zirconium oxide --- 56 | |
| 100.0% | Zirconium silicate --- 85 | |
| | 1,000 | |

Example 4

| (1) | (2) | (3) |
|---|---|---|
| $Na_2O$ --- 13.0 | Soda ash --- 8.5 | $Na_2O$ --- .444 |
| $K_2O$ --- 4.5 | Pot. nitrate --- 5.3 | $K_2O$ --- .101 |
| $MgO$ --- 0.9 | Zinc oxide --- 9.7 | $MgO$ --- .046 |
| $ZnO$ --- 10.5 | Red lead --- 7.9 | $ZnO$ --- .274 |
| $CaO$ --- 1.5 | Feldspar --- 10.8 | $CaO$ --- .057 |
| $PbO$ --- 8.2 | Glass --- 38.5 | $PbO$ --- .078 |
| $Al_2O_3$ --- 3.3 | Titanium dioxide --- 9.3 | $Al_2O_3$ .068 { $SiO_2$ - 1.310; $TiO_2$ - .264; $ZrO_2$ - .187 } |
| $SiO_2$ --- 37.3 | Zirconium oxide --- 10.0 | 1.761 |
| $TiO_2$ --- 10.0 | 100.0% | 1.000 |
| $ZrO_2$ --- 10.8 | | |
| 100.0% | | |

A frit composition of the above materials is made up in the usual well known manner, i. e. by fusing them at a high temperature in a smelting furnace, quenching in water, drying and grinding. The dry enameling process is carried out on a cast iron article and the enamel passes very successfully the aforementioned tests for acid and alkali resistance.

These formulas are characteristic of the type which gives an enamel having the desired properties. However, it should be clearly understood that we are not limited to these four, or any other formula. All of the above components may be varied within certain limits and still give a commercially practical enamel.

The limits of variation of the different components have been determined experimentally to be as follows; it being understood that slight variations can possibly be made.

1. The percentage of alkalies ($Na_2O$) and ($K_2O$) present in the finished enamel may vary from 15.0 to 19.5%, depending on the zinc and lead content. Of this alkali percentage, not less than 2 or more than 7% may be potash ($K_2O$).

2. Magnesia and lime (CaO) are not essential constituents of these enamels and may be replaced entirely by zinc oxide. The maximum amount of either CaO or MgO which may be present is 2%.

3. Zinc oxide must constitute at least 8% of the weight of the melted batch. The maximum amount depends on the alkali and lead oxide content, but cannot exceed 12%.

4. The percentage of lead oxide used depends on the alkalies and the zinc oxide present, but in any case is limited to between 5.5 and 12.0%.

5. The refractory oxides present in the melted batch, which are alumina, silica, titanium oxide and zirconium oxide must total 60-65% in order to give acid resistance. Each one of these refractory oxides may vary somewhat, depending upon the amounts of the others present. The limits for each one have been determined to be as follows: alumina ($Al_2O_3$): 2-4.5%, silica ($SiO_2$): 36.5-43%, titanium dioxide ($TiO_2$): 5-10.5%, and zirconium oxide ($ZrO_2$): 9.5-12%.

The limits of variation of the enamel components have been defined in terms of percentage weight in the melted batch, or in other words, by the analysis, because it is the final composition rather than the raw materials used which determine the properties of the enamel itself. With only two exceptions, the properties of an enamel depend on final composition rather than the nature of the raw materials used to obtain this final composition. Some nitrates, usually sodium or potassium nitrates, are essential in the raw batch mixture in order to maintain an oxidizing atmosphere in the furnace during smelting. Otherwise, reduction of certain metal oxides, particularly titanium dioxide, will occur and the resulting enamel will be discolored. Also, it is necessary to add silica to the raw batch in a combined form such as feldspar, sodium silicate, or ground glass cullet. Free silica, added as flint, ground quartz or sand, necessitates prolonged smelting in order to obtain complete fusion, and the prolonged smelting is detrimental to the enamel opacity.

However, with these two exceptions, it makes comparatively little difference whether lead is added as red lead, or as litharge; soda added as soda ash, sodium silicate or sodium nitrate; alumina added as glass cullet, feldspar or aluminum hydrate, and so forth.

Scrapped glass or "cullet" has not previously been used as an acid-resistant enamel raw material. We find that it is an excellent material for furnishing silica and soda as well as small amounts of alumina, potash, lime and magnesia. It can be added in such an amount as to bring the total $SiO_2$ content of the melted batch to between 36.5% to 43%, the proportions of the other ingredients being kept within the limits specified.

Any of the zirconium compounds ordinarily used as opacifiers can be used in these compositions. The most desirable compounds are zirconium silicate, zirconium oxide, alkali and alkaline earth zirconium silicates, zirconium hydroxide, alkali and alkaline earth zirconates, and to a lesser degree, basic zirconium hydroxide, and zirconium borates.

It is to be understood that the following claims include only those variations in percentage of ingredients within the limits of commercially satisfactory enamels, i. e. those which will give the proper gloss, will have the proper coefficient of expansion and the proper fusing behavior. Slight variations from the limits set will fall within the scope of the invention.

We claim:

1. The step in dry process enameling which comprises coating heated articles with a frit composition containing in the melted batch zinc oxide 8–12%, alkalies 15–19.5% of which $K_2O$ may vary 2–7%, lead oxide 5.5–12%, alumina 2–4.5%, silica 36.5–43%, titanium dioxide 5–10.5% and zirconium oxide 9.5–12%.

2. An enamel composition comprising in the melted batch the following:

|  | Per cent |
|---|---|
| Alkalies | 15 –19.5 |
| Magnesia and lime | 0 – 2 |
| Zinc oxide | 8 –12 |
| Lead oxide | 5.5–12 |
| Alumina | 2 – 4.5 |
| Silica | 36.5–43 |
| Titanium dioxide | 5 –10.5 |
| Zirconium oxide | 9.5–12 |

3. An enamel composition comprising in the melted batch the following in substantially the percentages given:

| | |
|---|---|
| $Na_2O$ | 13.0 |
| $K_2O$ | 4.0 |
| MgO | 1.0 |
| ZnO | 11.0 |
| CaO | 1.0 |
| PbO | 8.8 |
| $Al_2O_3$ | 3.0 |
| $SiO_2$ | 38.0 |
| $TiO_2$ | 9.0 |
| $ZrO_2$ | 11.2 |

4. An enamel composition comprising in the melted batch the following in substantially the percentages given:

| | |
|---|---|
| $Na_2O$ | 14.4 |
| $K_2O$ | 2.6 |
| ZnO | 11.5 |
| PbO | 9.5 |
| $Al_2O_3$ | 4.0 |
| $SiO_2$ | 40.0 |
| $TiO_2$ | 6.0 |
| $ZrO_2$ | 12.0 |

5. An enamel composition comprising in the melted batch the following in substantially the percentages given:

| | |
|---|---|
| $Na_2O$ | 13.0 |
| $K_2O$ | 4.5 |
| MgO | 0.9 |
| ZnO | 10.5 |
| CaO | 1.5 |
| PbO | 8.2 |
| $Al_2O_3$ | 3.3 |
| $SiO_2$ | 37.3 |
| $TiO_2$ | 10.0 |
| $ZrO_2$ | 10.8 |

6. In the process of preparing a dry process acid resisting enamel free of boric acid and fluorides the step of adding glass cullet, which is also free of boric acid and fluorides to the raw batch mixture to bring the total $SiO_2$ content of the melted batch to between 36.5% to 43.0%.

7. The step in dry process enameling which comprises coating heated articles with a frit composition free of boric oxide and fluorides, containing as basic constituents alkalies, alkaline earths, zinc oxide and lead oxide, as refractory oxides those of aluminum, titanium and silicon and as an opacifier zirconium oxide, the sum of the refractory oxides and opacifier being between 60% and 65% of the melted batch.

8. The step in dry process enameling which comprises coating heated articles with a frit composition free of boric oxide and fluorides, containing as basic constituents alkalies, zinc oxide and lead oxide, as refractory oxides those of aluminum, titanium and silicon and as an opacifier zirconium oxide, the sum of the refractory oxides and opacifier being between 60% and 65% of the melted batch.

PERRY G. BARTLETT.
HARRY C. KREMERS.